US008611657B2

(12) United States Patent
Krishnamurthy et al.

(10) Patent No.: US 8,611,657 B2
(45) Date of Patent: Dec. 17, 2013

(54) ROBUST FITTING OF SURFACES FROM NOISY DATA

(75) Inventors: Balaji Krishnamurthy, Noida (IN); Anubha Rastogi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 356 days.

(21) Appl. No.: 13/035,354

(22) Filed: Feb. 25, 2011

(65) Prior Publication Data

US 2013/0132407 A1 May 23, 2013

(51) Int. Cl.
*G06K 9/00* (2006.01)

(52) U.S. Cl.
USPC .......................................... 382/170

(58) Field of Classification Search
USPC .................................. 382/158–170
See application file for complete search history.

(56) References Cited

U.S. PATENT DOCUMENTS

| | | | | |
|---|---|---|---|---|
| 5,077,699 | A * | 12/1991 | Passamante et al. | 367/88 |
| 7,330,593 | B2 * | 2/2008 | Hong et al. | 382/209 |
| 7,760,912 | B2 * | 7/2010 | Dana et al. | 382/108 |
| 2002/0150938 | A1 * | 10/2002 | Kneipp et al. | 435/6 |
| 2002/0177760 | A1 * | 11/2002 | Ulug | 600/300 |
| 2005/0069198 | A1 * | 3/2005 | Dolan et al. | 382/162 |
| 2005/0089221 | A1 * | 4/2005 | Shirasawa | 382/167 |
| 2007/0143081 | A1 * | 6/2007 | Goldberg | 702/191 |
| 2008/0029697 | A1 * | 2/2008 | Willis et al. | 250/287 |
| 2009/0003693 | A1 * | 1/2009 | Yamamoto | 382/166 |
| 2010/0092038 | A1 * | 4/2010 | Theodore et al. | 382/103 |
| 2011/0019094 | A1 * | 1/2011 | Rossignol et al. | 348/607 |
| 2011/0064308 | A1 * | 3/2011 | Stein et al. | 382/170 |

OTHER PUBLICATIONS

Fischler, M.A., Bolles, R.C.: Random sample consensus: A paradigm for model fitting with applications to image analysis and automated cartography. Communications of the ACM 24 (1981) pp. 381-395.
Marr, D., Poggio, T.: Cooperative computation of stereo disparity. Science (194) pp. 283-287, Oct. 15, 1976.
Marr, D., Poggio, T.: A theory of human stereo vision. In: MIT AI Memo No. 451. (1977) pp. 1-89.
Marr, D., Poggio, T.: A computational theory of human stereo vision. Proceedings of Royal Society B-204 (1979) pp. 301-328.
Scharstein, D., Szeliski, R.: A taxonomy and evaluation of dense two-frame stereo correspondence algorithms. IJCV 47 (2002) pp. 7-42.
Wang, Z.F., Zheng, Z.G.: A region based stereo matching algorithm using cooperative optimization. IEEE Computer Society Conference on Computer Vision and Pattern Recognition (2008) pp. 1-8.
Rousseeuw, P.: Least median of squares regression. Journal of American Statistical Association 79 (1984) pp. 871-880.

* cited by examiner

*Primary Examiner* — Jingge Wu
(74) *Attorney, Agent, or Firm* — Wolfe-SBMC

(57) ABSTRACT

Various embodiments of methods and apparatus for fitting a surface to a data set are disclosed. A frequency distribution of an input data set is determined. Determining the frequency distribution includes assigning each data point of the input data set to a category representing a value of a variable for the respective data point. Responsive to identifying one or more discontinuities of the frequency distribution, a continuous section of the frequency distribution is identified as a first data set. A first equation is fit to the first data set.

20 Claims, 12 Drawing Sheets

*800*

| file | RANSAC | | | | Our Method | | | |
|---|---|---|---|---|---|---|---|---|
| | coverage (%) | error(%) th=1 | error(%) th=2 | time (ms) | coverage (%) | error(%) th=1 | error(%) th=2 | time (ms) |
| aloe | 88.2 | 11.48 | 6.03 | 26.7 | 88.16 | 12.15 | 7.26 | 1.6 |
| cones | 83.5 | 11.80 | 5.29 | 17.2 | 83.56 | 8.31 | 4.04 | 1.5 |
| teddy | 85.6 | 11.25 | 4.37 | 26.3 | 85.63 | 10.99 | 5.02 | 1.6 |
| venus | 87.4 | 5.97 | 1.48 | 12.5 | 87.43 | 3.29 | 1.20 | 1.6 |
| tsukuba | 86.9 | 3.50 | 1.73 | 3.1 | 87.01 | 5.09 | 1.01 | 0.0 |
| art | 88.4 | 34.56 | 22.36 | 15.5 | 88.49 | 29.92 | 18.13 | 6.1 |
| reindeer | 91.4 | 30.26 | 21.17 | 17.2 | 91.42 | 31.11 | 14.71 | 1.6 |
| moebius | 92.8 | 20.46 | 15.33 | 21.8 | 92.85 | 19.70 | 15.24 | 6.3 |

Table 2. The plane fitting results using RANSAC and our method on cross verified input 810  820  830  840  850  860  870  880  890

ROBUST FITTING OF SURFACES FROM NOISY DATA

DESCRIPTION OF THE RELATED ART

Surface fitting is the process of constructing a parametric equation relation or other mathematical function to fit a series of data points. A parametric equation is a method of defining a relation using parameters. A simple kinematical example of a parametric equation arises when one uses a time parameter to determine the position, velocity, and other information about a body in motion. Surface fitting can involve, among other methods, interpolation, where an exact fit to the data is required, or smoothing, in which a "smooth" function is constructed that approximately fits the data.

Fitted surfaces can be used as an aid for data visualization, to infer values of a function where no data are available, and to summarize the relationships among two or more variables. Extrapolation refers to the use of a fitted surface beyond the range of the observed data, and is subject to a greater degree of uncertainty, because extrapolation results may reflect the method used to construct the surface as much as the results reflect the observed data.

The method of least squares is a standard approach used to approximately fit a surface to a data set by seeking to ensure that the overall solution minimizes the sum of the squares of the errors made in solving every single equation. The best fit in the least-squares sense minimizes the sum of squared residuals, a residual being the difference between an observed value and the fitted value predicted by a model.

In applications to measured data, the fitting of a surface to a measured data set may be complicated by the presence of noise in the data set. Noise is generally defined as a corruption of the data set by the acquisition of erroneous or misleading values.

SUMMARY

Various embodiments of methods and apparatus for fitting a surface to a data set are disclosed. A frequency distribution of an input data set is determined.

Determining the frequency distribution includes assigning each data point of the input data set to a category representing a value of a variable for the respective data point. Responsive to identifying one or more discontinuities of the frequency distribution, a continuous section of the frequency distribution is identified as a first data set. A first equation is fit to the first data set.

BRIEF DESCRIPTION OF THE DRAWINGS

FIG. 8 depicts a table of comparative results generated by both use of conventional methods and performance of a method for implementing robust fitting of surfaces from image data, according to some embodiments.

Figure 1:
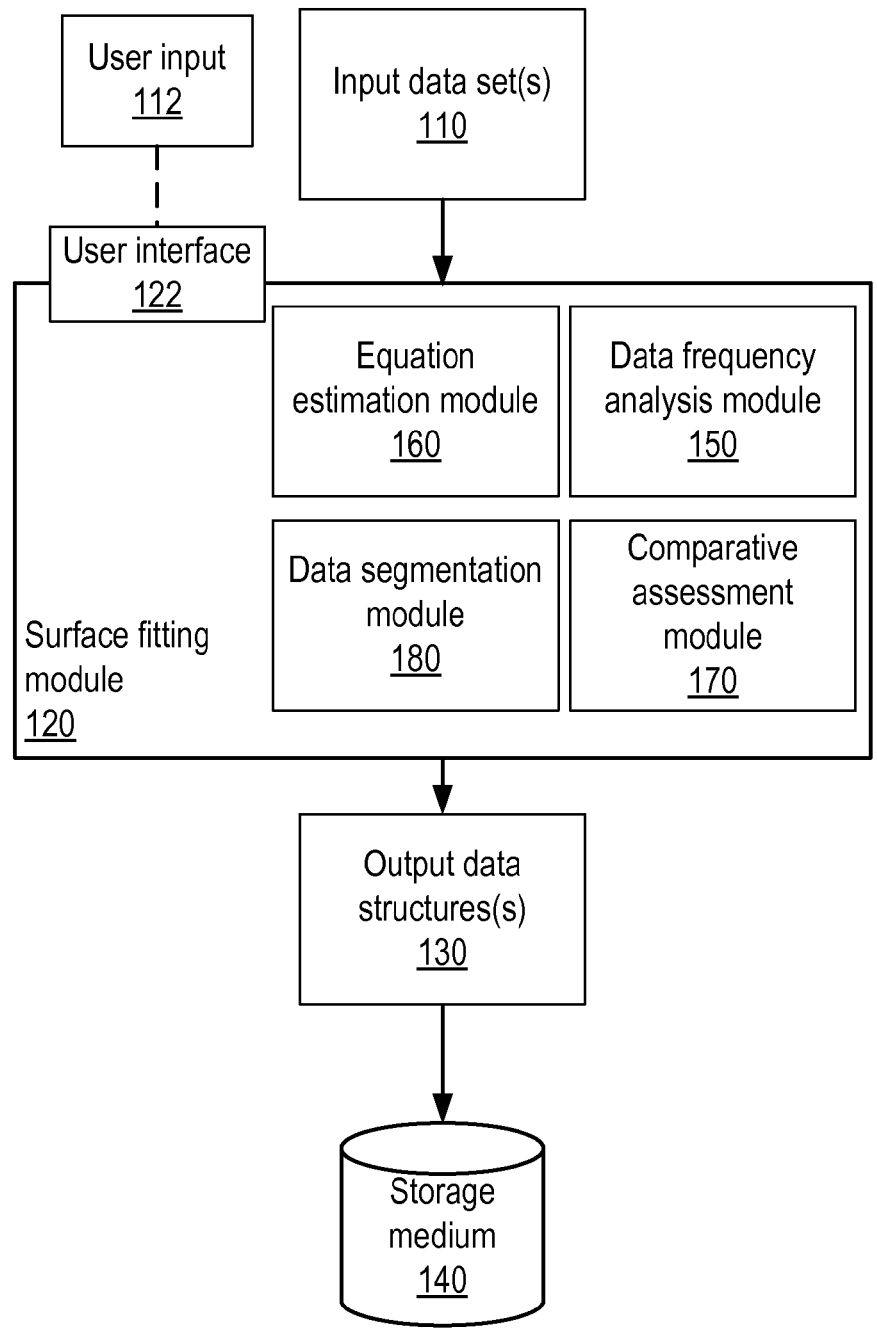
FIG. 1 illustrates a module that may implement robust fitting of surfaces from noisy data, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Robust Surface Fitting

Various embodiments of methods and apparatus for fitting a surface to a data set are disclosed. Some example embodiments applying the methods and techniques discussed herein to fitting surfaces to image data from various acquisition sources are disclosed for explanatory purposes. One of skill in the art, however, will readily realize in light of having read the present disclosure, that embodiments outside of image processing will equally apply the teachings disclosed herein without departing from the scope and intent of the present disclosure.

A frequency distribution of an input data set is determined. In one embodiment, such a frequency distribution of an input data set is a histogram of data representing points captured in an image data structure. Determining the frequency distribution includes assigning each data point of the input data set to a category representing a value of a variable for the respective data point. Such a value of a variable may include, in some embodiments, an intensity value from a grayscale image of a surface assumed to exhibit Lambertian reflectance or other height representation data. A continuous section of the frequency distribution is identified as a first data set. Such a continuous section of the frequency distribution will, in some embodiments, be a region of contiguous histogram categories in which each category has at least one data point assigned to the category.

A first equation is fit to the first data set. In some embodiments, a second equation is fit to a set of data points within the input data set but not within the first data set. In some embodiments, both equations are fit to their respective datasets using a weighted least squares method of equation fitting, though alternative embodiments use alternative equation-fitting methods without departing from the scope of the present disclosure. A determination is made as to whether the first equation or the second equation exhibits greater data set fidelity. Data set fidelity is a measure of whether a particular equation predicts, within a threshold of error, actual values of the dataset on which the equation is based. The determination is based on comparing an accuracy measurement for the first equation to an accuracy measurement for the second equation.

Some embodiments exploit an observation that the histogram of a smooth function on a compact connected domain is frequently continuous and frequently does not contain gaps. Expressed as a theorem, this observation for a continuous case can be expressed by first defining a histogram function where D is a compact connected domain on $R2$ and $z: D \rightarrow R$ is a smooth $C^{(infinity)}$ function on the domain D, whose range is [h0; h1]. The histogram of the function z is a function $Hz:[h0; h1] \rightarrow R$ defined as:

$$H_z(t) = \int_{z(x,y)=t} 1 \, dxdy. \quad (1)$$

One skilled in the art will realize, in light of having read the present disclosure that the definition is similar to that of the length of the level curve $H1(\theta\Omega t)$. If D is a compact connected domain on $R2$ and $z:D \rightarrow R$ is a smooth $C^{(infinity)}$ function on the domain D, whose range is [h0; h1], then the histogram of the function Hz does not contain any gaps. That is, $$H_z(t) \neq 0 \, \forall t \in [h_0, h_1]. \quad (2)$$

One skilled in the art will realize, in light of having read the present disclosure that since z is a smooth function, it defines a smooth 2 dimensional sub-manifold of $R3$. It also follows that the level sets $\theta\Omega t$ are smooth one dimensional curves embedded in the surface defined by z. Since by definition the histogram is same as the length of the level set, the result follows.

One skilled in the art will realize, in light of having read the present disclosure that the above hypothesis regarding the histogram of smooth surfaces can be experimentally verified by looking at smooth patches of range images, which will provide evidence that the discretization does not cause the hypothesis to fail.

One skilled in the art will further realize, in light of having read the present disclosure that stereo algorithms typically eliminate several erroneous depths assigned in the cost aggregation stage by performing a left-right cross verification. The errors that remain after this operation are usually concentrated in small coherent regions. One skilled in the art will further realize, in light of having read the present disclosure, that the pixels that were deemed to be erroneous by cross verification will have no depth assigned to them.

Given a segment (a connected compact subset of the image) and an initial sparse disparity estimate z0, some embodiments construct a histogram Hz for the subset. Defining m as the median value of the histogram Hz, embodiments search for discontinuities around m in the histogram Hz. Defining s to be the location of the first discontinuity less than m and e to be the first discontinuity to the right of m, some embodiments consider all depths in the open interval (s:e) as a set of surface inliers and the remaining points as outliers of the surface. Some embodiments use the presence of two consecutive zeros in the histogram as the mark of a discontinuity. Depending on the nature of the input data, different criteria will be employed without departing from the scope and intent of the disclosed embodiments.

Some embodiments fit a plane to the inlier data using a weighted least squares technique. Points whose disparity estimate is within a small threshold $\delta$ of the median disparity value m are weighted by a constant w>1. The other points get a weight of 1. Such embodiments thereby seek to ensure that median values tend to belong to the inliers of the fitted plane. Some embodiments repeatedly run a plane fitting algorithm on the inlier data, for a few iterations. After each iteration, some embodiments reject the points that lie at a distance greater than a threshold r from the fitted plane as outliers. In practice, some embodiments have been found to, within two iterations, provide a satisfactory fit. In order to guard against over-fitting to the wrong data based on an incorrect initial outlier rejection, at each iteration, some embodiments attempt to ascertain whether a better fit (e.g., a fit correctly predicting more points of the data set) can be obtained based on all the outlier data (i.e., the data points outside the (s,e) interval). If such embodiments find a better fit, the resulting plane is used as the estimate for subsequent iterations. An example embodiment of an algorithm for executing the methods and techniques discussed herein is:

```
Inliers = 0
Outliers = 0
Plane = (0,0,0) {//The triple (a,b,c) represents the plane ax+by+c}
{Inliers,Outliers} = OutlierReject( )
for i = 1 to n do
    {Plane1,Inliers1,Outliers1} = FitPlane(Inliers)
    if || Inliers1 ||≥|| Outliers1 || then {{//|| A || is the cardinality of
    set A}}
        Inliers = Inliers1
        Outliers = Outliers1
        Plane = Plane1
    else
        {Plane2,Inliers2,Outliers2} = FitPlane(Outliers1)
        if || Inliers2 ||≥|| Inliers1 || then
            Inliers = Inliers2
            Outliers =Outliers2
            Plane = Plane2
        else
            Inliers = Inliers1
            Outliers = Outliers1
            Plane = Plane1
        end if
    end if
end for
```

Note that the algorithm provided above lists an "OutlierReject( )" operation. Embodiments perform outlier rejection, as described below, on the basis of identification of histogram discontinuities. Embodiments of the disparity estimation algorithm described above followed by cross verification provide depth maps that have a coverage of about 70% and an error rate of about 10% as discussed below with respect to FIG. 7. These depth maps may be used by some embodiments as an input data set to a plane fitting algorithm. For segmentation, some embodiments use a mean shift based algorithm. The mean shift based approach can be tuned to give large segments or small segments (over-segmentation). With larger segments, the mean-shift algorithm is sometimes prone to errors. Embodiments provide a plane fitting implementation that is unexpectedly superior to conventional RANSAC implementations, which are discussed below, in terms of processing performance. In terms of performance, embodiments of the methods and techniques described herein are 4× to 10× faster than RANSAC.

Robust Surface Fitting Module

Some embodiments may include a means for identifying a subset of data as a surface. For example, in the context of a digital image, embodiments of a surface fitting module may identify a region of homogeneous color as representing a depiction of a plane in an image or in a stereo image pair, such as the stereo image pairs mentioned above and discussed below with respect to FIGS. 9A-9H. Alternatively, a candidate surface may be identified through user input identifying a portion of a digital image to which an equation of a surface is to be fitted, and may generate a frequency distribution of grayscale intensity values or other image data used as a proxy for image height. The surface fitting module may in some embodiments be implemented by a non-transitory, computer-readable storage medium and one or more processors (e.g., CPUs and/or GPUs) of a computing apparatus. The non-transitory computer-readable storage medium may store program instructions executable by the one or more processors to cause the computing apparatus to perform identifying a portion of a digital image to which an equation of a surface is to be fitted, and fitting to the identified portion of the digital image the surface equations, as described herein. Other embodiments of the surface fitting module may be at least partially implemented by hardware circuitry and/or firmware stored, for example, in a non-volatile memory.

Figure 10:
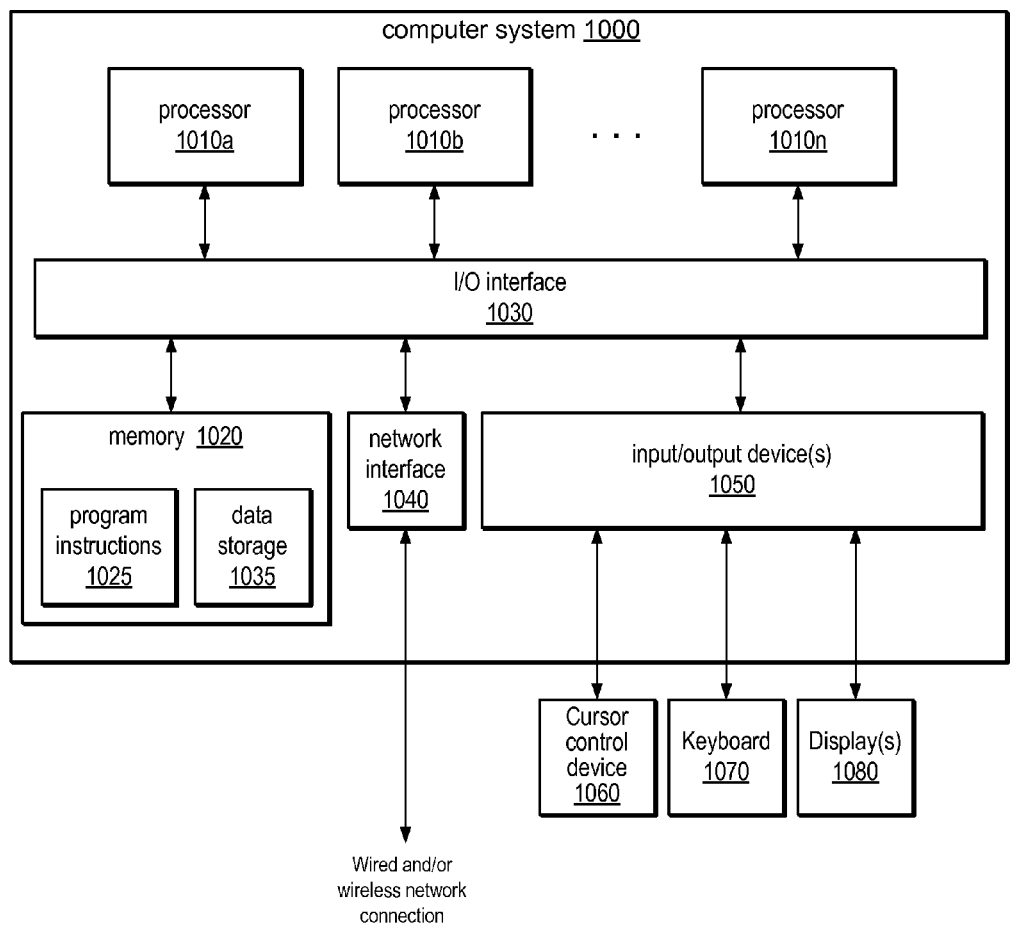
FIG. 10 illustrates an example computer system that may be used in embodiments.

FIG. 1 illustrates a surface fitting module that may implement one or more of the robust surface fitting techniques and tools illustrated in FIGS. 1-9 or may implement the algorithm discussed above. Surface fitting module 120 may, for example, implement one or more of an image processing surface fitting tool, a measured data surface fitting tool, a candidate surface identification tool, and a data segmentation tool. FIG. 10 illustrates an example computer system on which embodiments of surface fitting module 120 may be implemented. Surface fitting module 120 receives as input one or more input data sets 110. Example digital images are discussed below with respect to FIGS. 9A-9H. Surface fitting module 120 may receive user input 112 activating a surface-fitting tool. Surface fitting module 120 then fits surface equations to the input data set(s) 110, according to user input 112 received via user interface 122. Surface fitting module 120 generates as output one or more output data structures 130, which in some embodiments will be composed of equation (s) representing a surface, information denoting which points of input data set(s) 110 are suspected of conforming to the resulting surface equation (s), and, in some embodiments, visual representations of surface(s) and data from input data set(s) 110. Output data structure(s) 130 may, for example, be stored to a storage medium 140, such as system memory, a disk drive, DVD, CD, etc.

In some embodiments, surface fitting module 120 may provide a user interface 122 via which a user may interact with the module 120, for example to activate surface-fitting tool, to perform a selection gesture, and to select data sets for surface fitting as described herein. In some embodiments, the user interface 122 may provide user interface elements whereby the user may select options including, but not limited to, forms of data to be used as input data sets and conditions under which input data is to be acquired, thresholds for determining whether a data point conforms to a surface, thresholds for determining whether additional iterations of surface-fitting techniques are required, and output formats and preferences for output data structures 130.

In some embodiments, a data segmentation module 180 acquires input data sets. Additional functions of data segmentation module 180 may include identifying input data set 110 from an initial data set (not shown). For example, identifying input data set 110 may include identifying a continuous set of data points in the initial data set. Alternatively, identifying input data set 110 further comprises identifying a set of data points in the initial data set within a region of homogeneous color or may include identification of data points representing a single surface from a set of multiple images.

A data frequency analysis module 150 may determine a frequency distribution of input data set 110. In one embodiment, such a frequency distribution of an input data set is a histogram, such as that described below with respect to FIG. 6, of data representing points captured in an image data structure. Data frequency analysis module 150 may assign each data point of input data set 110 to a category representing a value of a variable for the respective data point. Data frequency analysis module 150 may identify discontinuities in such a frequency distribution and may identify a continuous section of the frequency distribution as a first data set. Such a continuous section of the frequency distribution will, in some embodiments, be a region of contiguous histogram categories in which each category has at least one data point assigned to the category.

In some embodiments, an equation estimation module 160 fits a first equation to the first data set. Likewise, in some embodiments, equation estimation module 160 fits a second equation to a set of data points within the input data set but not within the first data set. In some embodiments, equation estimation module generates new data sets by excluding points from data sets, as described below with respect to FIG. 2, and performs iterative fitting of equations to the new data sets. In some embodiments, equation estimation module 160 fits equations to their respective datasets using a weighted least squares method of equation fitting, though alternative embodiments use alternative equation-fitting methods without departing from the scope of the present disclosure. A comparative assessment module 170 makes determinations as to whether the first equation or the second equation exhibits greater data set fidelity. Comparative assessment module 170 bases the determination on a comparison of an accuracy measurement for the first equation to an accuracy measurement for the second equation.

Operations for Surface Fitting with Noisy Data

Figure 2A:
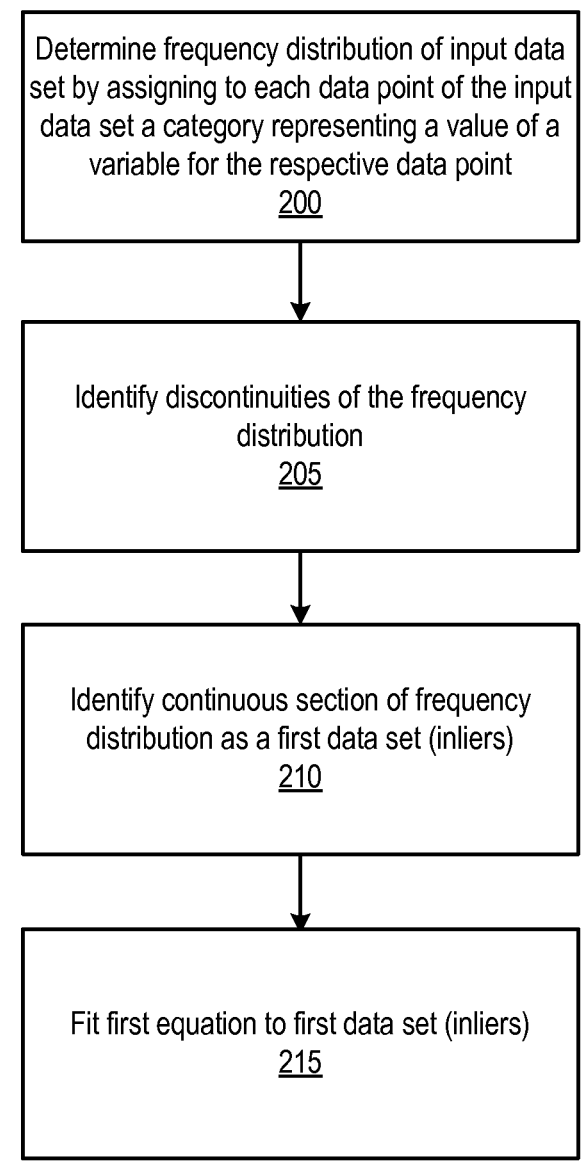
FIG. 2A depicts a flowchart of operations used in a method for implementing robust fitting of surfaces from noisy data, according to some embodiments.

FIG. 2A depicts a flowchart of operations used in a method for implementing robust fitting of surfaces from noisy data, according to some embodiments. A frequency distribution of an input data set is determined (block 200). In some embodiments, the determining the frequency distribution includes assigning to each data point of the input data set a category representing a value of a variable for the respective data point. Discontinuities of the frequency distribution are identified (block 205). A continuous section of the frequency distribution is identified as a first data set (block 210). A first equation is fit to the first data set (block 215). The first data set may be elsewhere referred to as "inliers" herein.

Figure 2B:
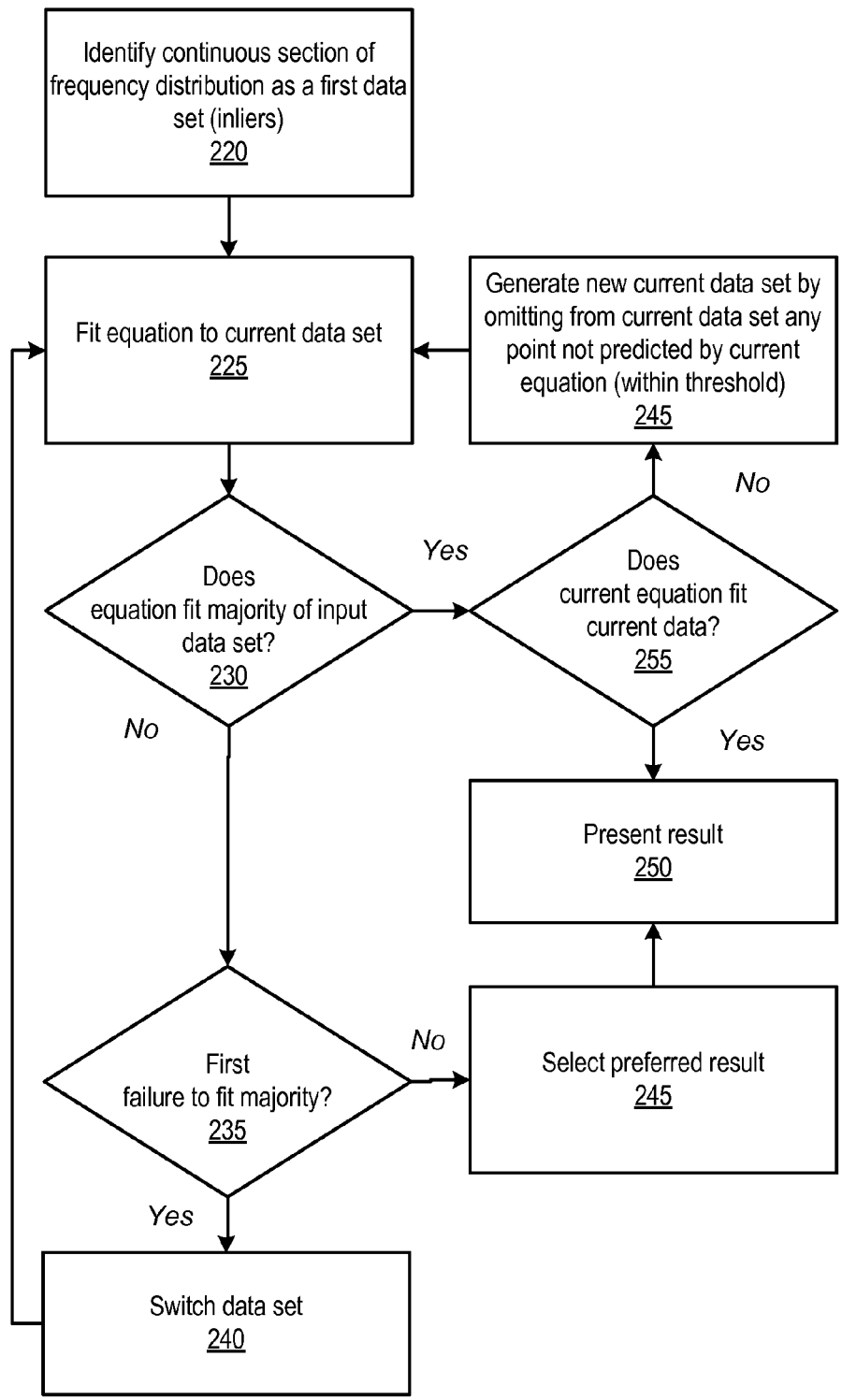
FIG. 2B depicts a flowchart of operations used in an iterative method for implementing robust fitting of surfaces from noisy data, according to some embodiments.

FIG. 2B depicts a flowchart of operations used in an iterative method for implementing robust fitting of surfaces from noisy data, according to some embodiments. A continuous section of a frequency distribution is identified as a first data set (block 220), which becomes the current data set. The first data set may be elsewhere referred to as "inliers" herein. An equation is fit to the current data set (block 225). Some embodiments fit a plane to the inlier data using a weighted least squares technique, as described above. A determination is made as to whether the equation generated at block 225 fits a majority of the input data set identified at block 220 (block 230). With respect to the determination in block 230, embodiments will ascertain whether the each point of the input data set falls within a threshold distance of a point predicted to exist by the current equation. Use of such thresholds is described above.

If the current equation does fit a majority of the input data set, a determination is made to whether the current equation fits the current data set (block 255). With respect to the determination in block 255, embodiments will ascertain a percentage of data points of the current data set that fall within a threshold distance of a point predicted to exist by the current equation. While the determination of block 255 is one embodiment of an operation for determining if a current equation is sufficiently accurate, embodiments will employ different statistical definitions of sufficient accuracy without departing from the scope and intent of the present disclosure. If the percentage of data points of the current data set falling within a threshold distance of a point predicted to exist by the current equation is above a threshold percentage, which may, in some embodiments, be user-configurable, a result is presented (block 250). Presentation of a result will vary between embodiments, and may include actual graphical display of a surface or may simply include recording of a result to a storage medium.

Returning to block 255, if the percentage of data points of the current data set falling within a threshold distance of a point predicted to exist by the current equation is below a threshold percentage, a new current data set is generated by omitting from the current data set any point or points not predicted by the current equation (block 245). Again, with respect to whether a point is predicted by the current equation, some embodiments will ascertain whether the each point of the input data set falls within a threshold distance of a point predicted to exist by the current equation. The process then returns to block 225, which is described above.

Returning to block 230, if the current equation does not fit a majority of the input data set, a determination is made as to whether the current failure to fit the equation to a majority of the data points is a first such failure with respect to the data from which the first data set is drawn (block 235). If the current failure to fit the equation to a majority of the data points is a first such failure with respect to the data from which the first data set is drawn, then the current data set is replaced with the outliers from the inlier determination action of block 220 (block 240). The process then returns to block 225, which is described above.

Returning to block 235, if the current failure to fit the equation to a majority of the data points is not the first such failure with respect to the data from which the first data set is drawn, a preferred result is selected. In such a case, because the failure is not the first such failure, embodiments will have fit at least two equations, one for the input data set and one for outliers from the inlier determination action of block 220. The accuracy of the two equations is compared, and a more accurate equation of the two is selected as a result. The process then proceeds to step 250, which is described above.

Figure 3:
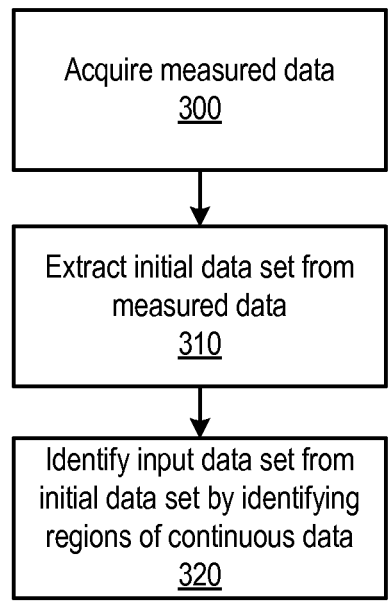
FIG. 3 depicts a flowchart of operations used to pre-process data for use by a method for implementing robust fitting of surfaces from noisy data, according to some embodiments.

FIG. 3 depicts a flowchart of operations used to pre-process data for use by a method for implementing robust fitting of surfaces from noisy data, according to some embodiments. Measured data is acquired (block 300). An initial data set is extracted from the measured data (block 310). The input data set is identified from the initial data set by identifying regions of continuous data (e.g., in the context of image processing, regions of homogeneous color) (block 320).

Figure 4:
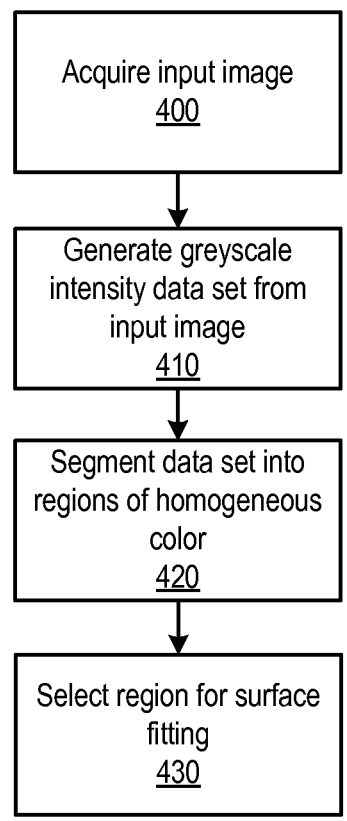
FIG. 4 illustrates a flowchart of operations used to pre-process image data for use by a method for implementing robust fitting of surfaces from image data, according to some embodiments.

FIG. 4 illustrates a flowchart of operations used to pre-process image data for use by a method for implementing robust fitting of surfaces from image data, according to some embodiments. An input image is acquired (block 400). A grayscale intensity data set is generated from the input image (block 410). The data is segment into regions of continuous color (step 420). A region is selected for surface fitting (step 430).

Image Processing Operations for Surface Fitting with Noisy Data

Figure 5:
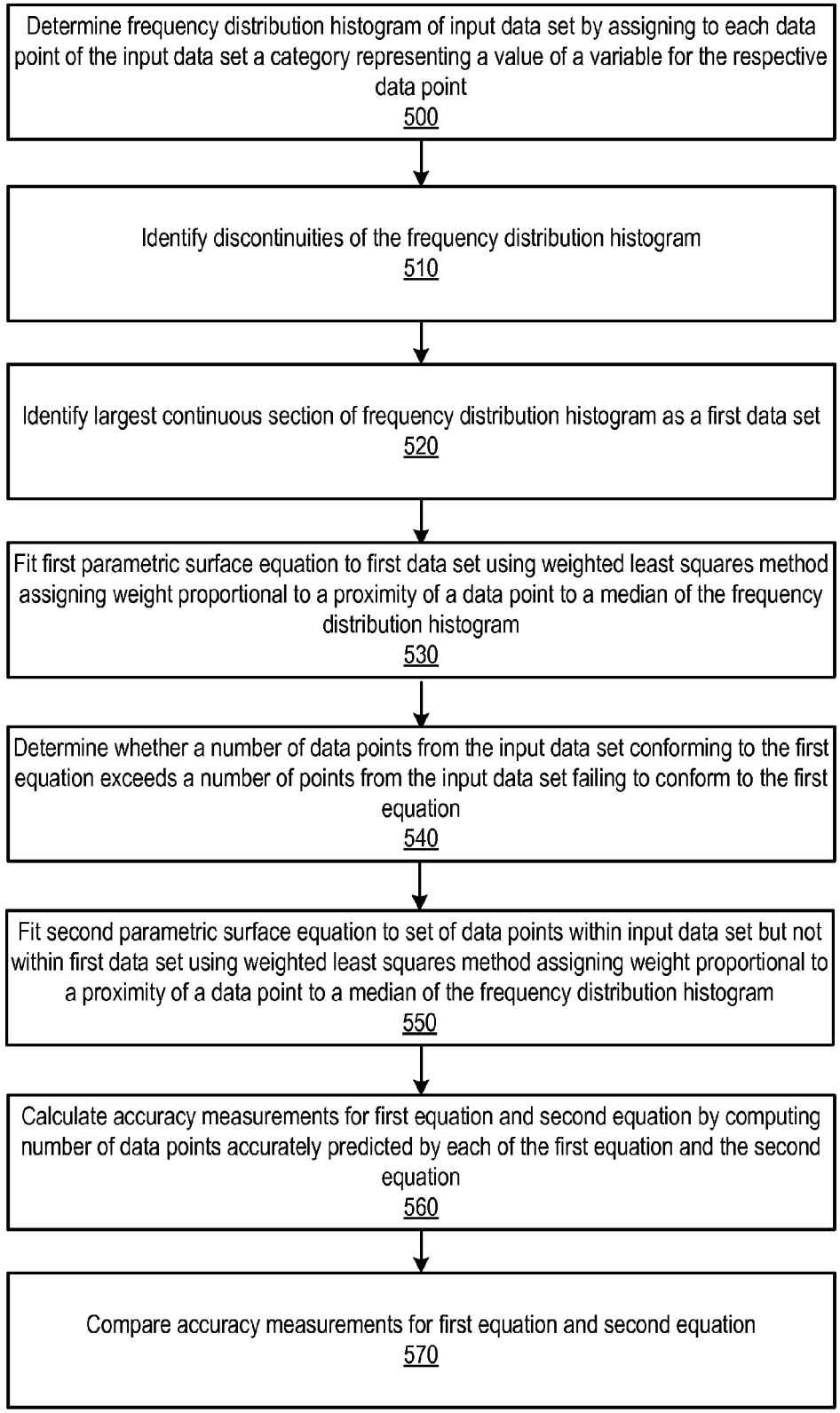
FIG. 5 depicts a flowchart of operations used in a method for implementing robust fitting of surfaces from image data, according to some embodiments.

FIG. 5 depicts a flowchart of operations used in a method for implementing robust fitting of surfaces from image data, according to some embodiments. A frequency distribution histogram of an input data set is determined by assigning to each data point of the input data set a category representing a value of a variable for the respective data point (step 500). Discontinuities of the frequency distribution histogram are identified (step 510). A largest continuous section of the frequency distribution histogram is identified as a first data set (step 520). A first parametric surface equation is fit to the first data set using a weighted least squares method assigning weight proportional to a proximity of a data point to a median of the frequency distribution histogram (step 530).

A determination is made as to whether a number of data points from the input data set conforming to a first equation exceeds a number of data points from the input data set failing to conform to the first equation (block 540). A second parametric surface equation is fit to the set of data points within the input data set but not within the first data set using a weighted least squares method assigning weight proportional to a proximity of a data point to a median of the frequency distribution histogram (block 550). Performance of block 540 and subsequent blocks assumes that the number of data points from the input data set conforming to a first equation does not exceed a number of data points from the input data set failing to conform to the first equation. Accuracy measurements for the first equation and second equation are calculated by computing a number of data points accurately predicted by each of the first equation and the second equation (block 560). The accuracy measurements for the first and second equations are compared (block 570).

As discussed elsewhere in the present disclosure, embodiments may iteratively execute operations described with respect to FIG. 5A. Some embodiments terminate the iterations either by setting a predetermined number of iterations or by letting the iterations proceed until the number of inliers of the newly determined surface does not change significantly from the previous surface (e.g below a predetermined threshold.)

Figure 6:
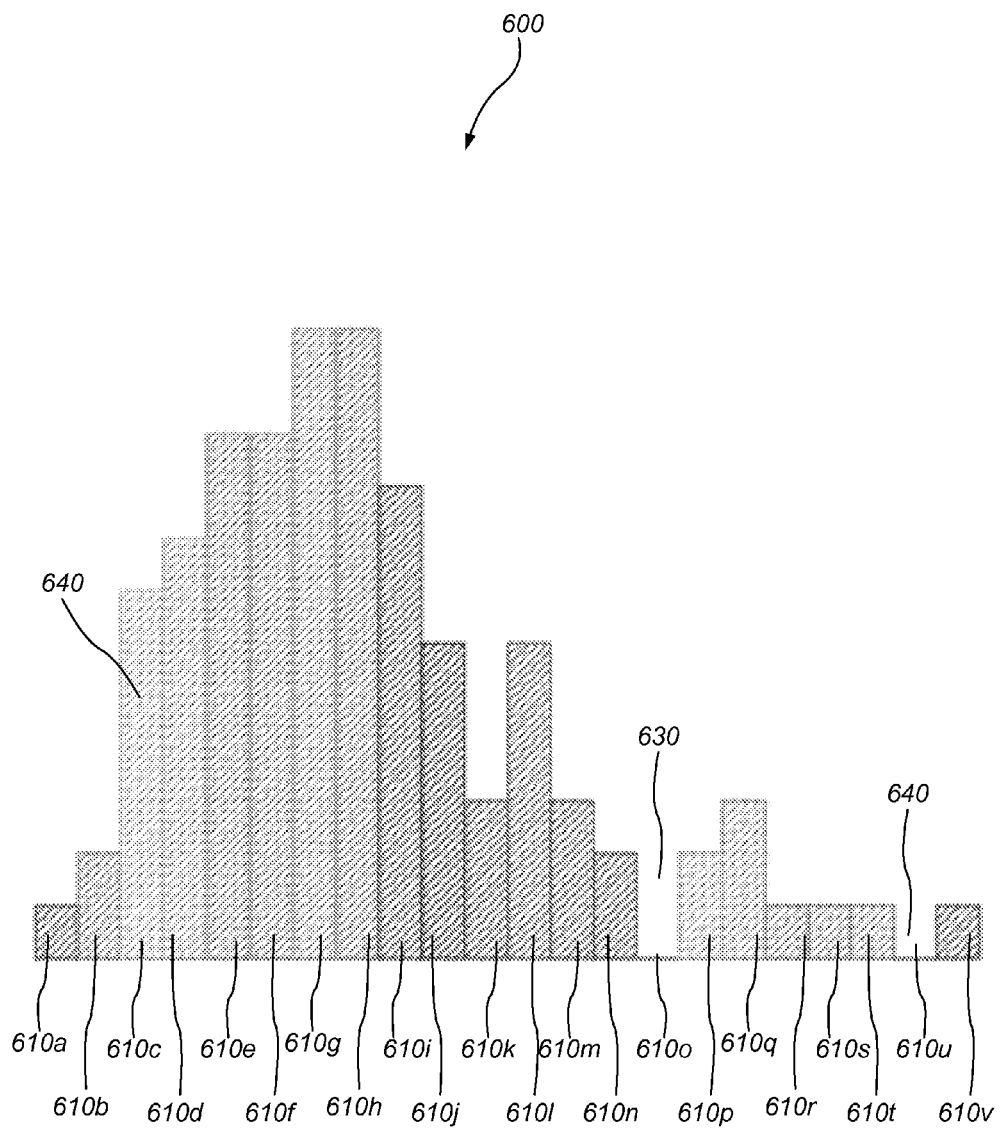
FIG. 6 depicts a histogram suitable for use with a method for implementing robust fitting of surfaces from noisy data, according to some embodiments.

FIG. 6 depicts a histogram suitable for use with a method for implementing robust fitting of surfaces from noisy data, according to some embodiments. Histogram graph 600 presents a visual representation of the values contained in a data set. Each of categories 610*a*-610*v* represents a count of the number of data points taken the value represented by the category. A first discontinuity 630 and a second discontinuity 640 indicate locations where no data points of the data set take a particular value. In some embodiments, a discontinuity will be differently defined. For instance, some embodiments will define a discontinuity as a point where two consecutive categories with no values, while other embodiments will define a discontinuity as a category with a relatively low (e.g., one or two) number of values. In histogram graph 600, a largest continuous data set is defined by first discontinuity 630 and includes data points within categories 610*a*-610*n*.

Results of Image Processing Operations for Surface Fitting with Noisy Data

Figure 7:
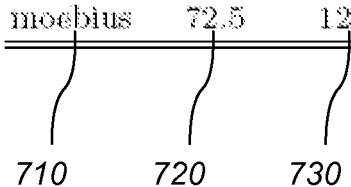
FIG. 7 illustrates a table of operation results generated by performance of a method for implementing robust fitting of surfaces from image data, according to some embodiments.
Figure 9A:
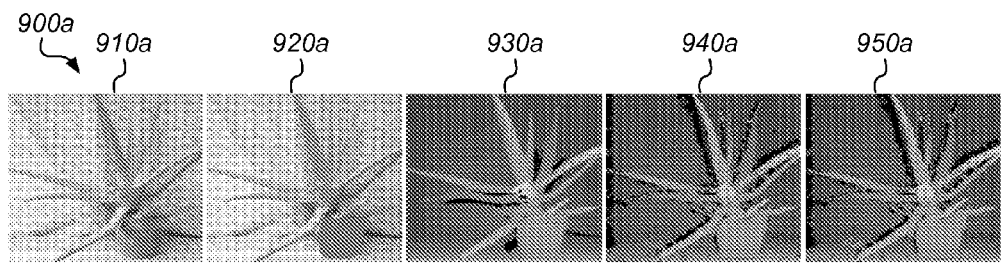
FIGS. 9A-9H illustrate graphical dataset samples and results generated by performance of a method for implementing robust fitting of surfaces from image data, according to some embodiments.
Figure 9B:
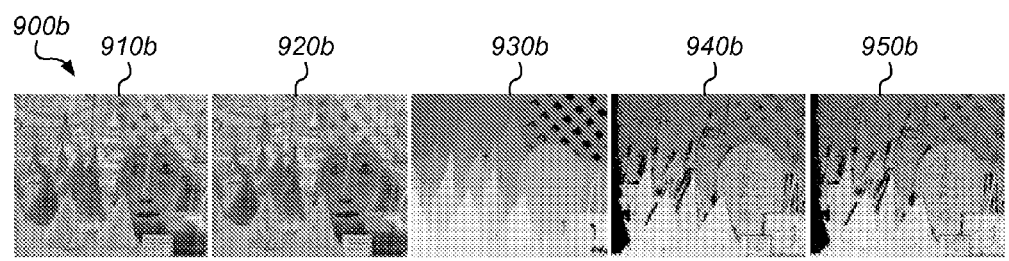
Figure 9C:
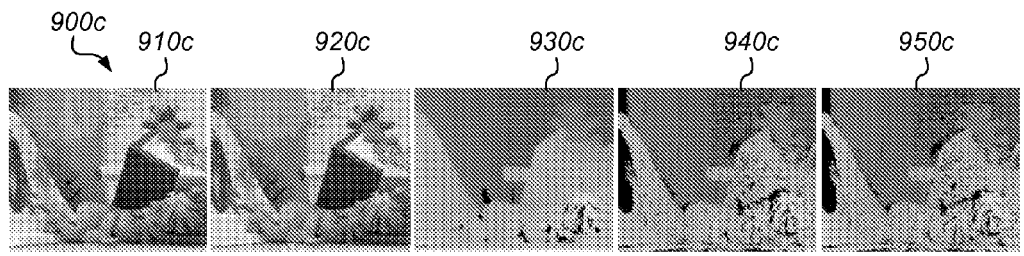
Figure 9D:
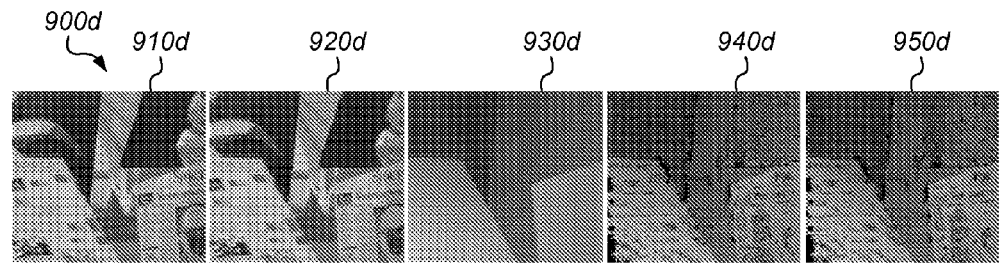
Figure 9E:
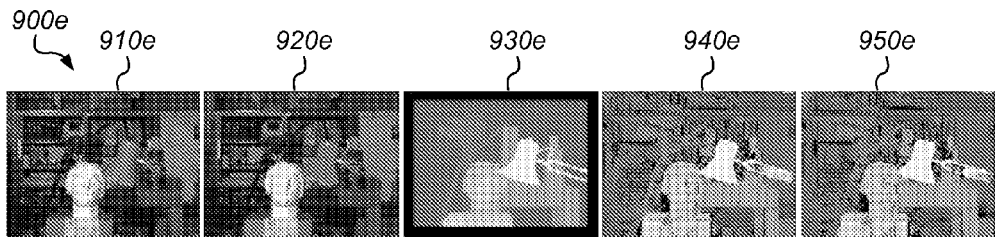
Figure 9F:
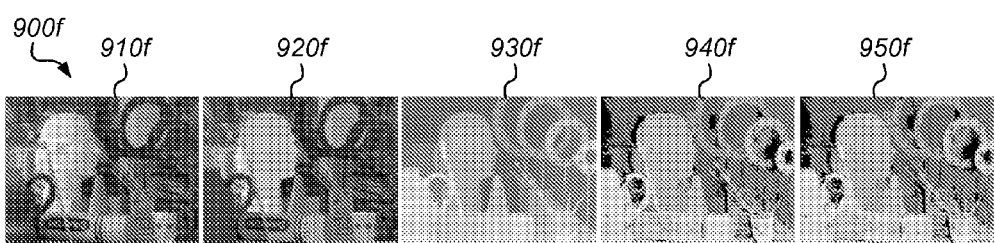
Figure 9G:
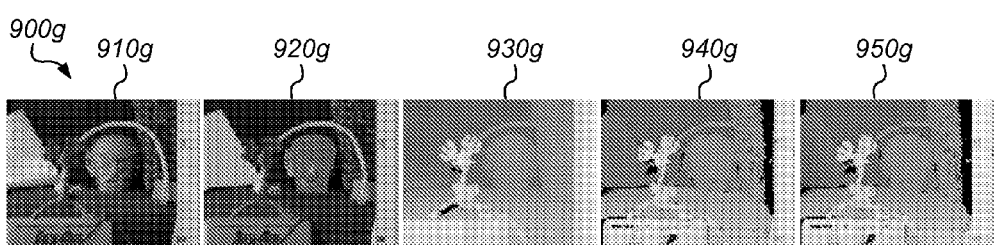
Figure 9H:
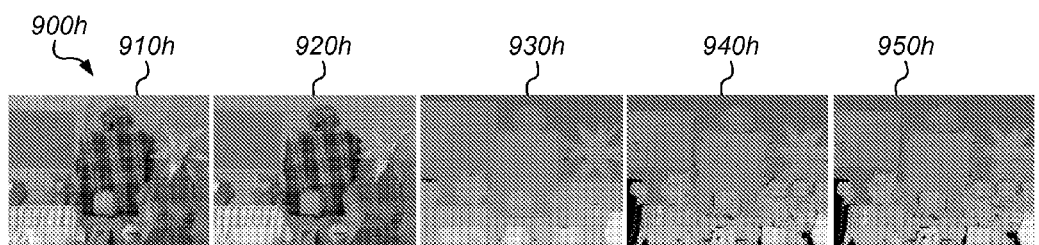

FIG. 7 illustrates a table of operation results generated by performance of a method for implementing robust fitting of surfaces from image data, according to some embodiments. Table 700 illustrates coverage areas and error percentage areas for surface identification on a set of input images with known surface values, called cross-verified data sets. For each input image file 710, a coverage percentage 720 represents the percentage of the image in which an example embodiment of the methods and techniques described herein identified the existence of a surface and rendered a parametric equation of the surface. An error percentage 730 represents the percentage of the image in which an example embodiment of the methods and techniques described herein inaccurately identified a parametric equation of the surface.

FIG. 8 depicts a table of comparative results generated by both use of conventional methods and performance of a method for implementing robust fitting of surfaces from image data, according to some embodiments. Table 800 illustrates coverage areas and error percentage areas for surface identification on a set of input images with known surface values, called cross-verified data sets for both a conventional RANSAC method and for the methods described herein. RANSAC is an abbreviation for "RANdom SAmple Consensus". It is an iterative method to estimate parameters of a mathematical model from a set of observed data which contains outliers. It is a non-deterministic algorithm in the sense that it produces a reasonable result only with a certain probability, with this probability increasing as more iterations are allowed. A basic assumption is that the data consists of "inliers", i.e., data whose distribution can be explained by some set of model parameters, and "outliers" which are data that do not fit the model. In addition to this, the data can be subject to noise. The outliers can come, e.g., from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data.

For each input image file 810, a coverage percentage 820 represents the percentage of the image in which an example embodiment of a conventional RANSAC method identified the existence of a surface and rendered a parametric equation of the surface. A first error percentage 830 represents the percentage of the image in which the example embodiment of the conventional RANSAC method inaccurately identified a parametric equation of the surface. A second error percentage 840 represents a second measure of the percentage of the image in which the example embodiment of the conventional RANSAC method inaccurately identified a parametric equation of the surface. A run time 850 indicates the length of time needed by the embodiment of the conventional RANSAC method to process the file.

For each input image file 810, a coverage percentage 860 represents the percentage of the image in which an example embodiment methods described herein identified the existence of a surface and rendered a parametric equation of the surface. A first error percentage 870 represents the percentage of the image in which the example embodiment of methods described herein inaccurately identified a parametric equation of the surface. A second error percentage 880 represents a second measure of the percentage of the image in which the example embodiment of the methods described herein inaccurately identified a parametric equation of the surface. A run time 890 indicates the length of time needed by the embodiment of the methods described herein to process the file.

A comparison of run time 850 to run time 890 reveals an unexpected advantage of the surface fitting methods described herein. Embodiments of the surface-fitting methods described above have executed on each of files 810 in a time that is an order of magnitude faster than the time used by the conventional RANSAC methods conventionally employed for surface fitting. This unexpected improvement in speed of execution as demonstrated by comparison of run time 850 to run time 890 reveals superior performance by the above-described surface-fitting methods.

FIGS. 9A-9H illustrate graphical dataset samples and results generated by performance of a method for implementing robust fitting of surfaces from image data, according to some embodiments. Image sets 900*a*-900*e* track an image pair used for surface mapping according to some embodiments. Image sets 900*a*-900*e* include left images 910*a*-910*e* of a stereo image pair, mean shifted segmentation results 920*a*-920*e*, ground truth depth maps 930*a*-930*e*, results of the methods and techniques described above 940*a*-940*e* and RANSAC results 950*a*-950*e*.

Example System

Embodiments of a surface-fitting module and/or of the various surface fitting techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a surface fitting module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a surface fitting module as described herein, and data storage 1035, comprising various data accessible by program instructions 1025. In one embodiment, program instructions 1025 may include software elements of embodiments of a surface fitting module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a surface fitting module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   determining a frequency distribution of an input data set, wherein the determining the frequency distribution comprises assigning each data point of the input data set to a category representing a value of a variable for the respective data point;
   identifying one or more discontinuities indicated by categories within the frequency distribution that are assigned a total number of data points below a threshold value set to define discontinuity;
   responsive to identifying one or more discontinuities of the frequency distribution, identifying a continuous section of the frequency distribution as a first data set; and
   fitting a first equation to the first data set.

2. The computer-implemented method of claim 1, further comprising:
   determining whether the first equation is sufficiently accurate; and
   responsive to determining that the first equation is not sufficiently accurate:
      generating a new data set comprising only points predicted by the current equation, and
      fitting a modified first equation to the new data set.

3. The computer-implemented method of claim 1, further comprising:
   fitting a second equation to a set of data points within the input data set but not within the first data set;
   determining whether the first equation or the second equation exhibits a greater data set fidelity, wherein
   the determining whether the first equation or the second equation exhibits the greater data set fidelity comprises comparing an accuracy measurement for the first equation to an accuracy measurement for the second equation.

4. The computer-implemented method of claim 1, further comprising:
   determining whether a number of data points from the input data set conforming to the first equation exceeds a number of points from the input data set failing to conform to the first equation.

5. The computer-implemented method of claim 1, further comprising:
   identifying the input data set from an initial data set, wherein the identifying the input data set further comprises identifying a continuous set of data points in the initial data set.

6. The computer-implemented method of claim 1, further comprising:
   identifying the input data set from an initial data set, wherein the identifying the input data set further comprises identifying a set of data points in the initial data set within a region of homogeneous color.

7. The computer-implemented method of claim 1, further comprising:
   identifying the input data set from an initial data set, wherein the initial data set comprises a set of depth values extracted from one or more images of a scene acquired from different view points.

8. The computer-implemented method of claim 1, wherein the fitting the first equation further comprises fitting a parametric equation of a surface to the first data set.

9. The computer-implemented method of claim 1, wherein the fitting the first equation further comprises using a weighted least-squares method assigning weight proportional to a proximity of a data point to a median of the frequency distribution.

10. The computer-implemented method of claim 3, wherein
the fitting the first equation comprises fitting the first equation using a weighted least-squares method; and
the fitting the second equation comprises fitting the second equation using the weighted least-squares method.

11. A system, comprising:
at least one processor; and
a memory comprising program instructions, wherein the program instructions are executable by the at least one processor to:
determine a frequency distribution of an input data set, wherein the program instructions executable by the at least one processor to determine the frequency distribution further comprise program instructions executable by the at least one processor to assign each data point of the input data set to a category representing a value of a variable for the respective data point;
utilize the frequency distribution to identify discontinuities indicated by one or more consecutive categories in the frequency distribution that contain fewer data points than a value set to define discontinuity;
responsive to identifying one or more discontinuities of the frequency distribution, identify a continuous section of the frequency distribution as a first data set; and
fit a first equation to the first data set.

12. The system of claim 11, further comprising program instructions executable by the at least one processor to:
determine whether the first equation is sufficiently accurate; and
responsive to determining that the first equation is not sufficiently accurate,
generate a new data set comprising only points predicted by the current equation, and
fit a modified first equation to the new data set.

13. The system of claim 11, further comprising program instructions executable by the at least one processor to:
fit a second equation to a set of data points within the input data set but not within the first data set;
determine whether the first equation or the second equation exhibits a greater data set fidelity, wherein
the program instructions executable by the at least one processor to determining whether the first equation or the second equation exhibits the greater data set fidelity further comprise program instructions executable by the at least one processor to comparing an accuracy measurement for the first equation to an accuracy measurement for the second equation.

14. The system of claim 13, wherein
the program instructions executable by the at least one processor to fit the first equation further comprise program instructions executable by the at least one processor to fit the first equation using a weighted least-squares method; and
the program instructions executable by the at least one processor to fit the second equation further comprise program instructions executable by the at least one processor to fit the second equation using the weighted least-squares method.

15. The system of claim 11, further comprising program instructions executable by the at least one processor to identify the input data set from an initial data set, wherein the initial data set comprises a set of intensity values extracted from an image.

16. A computer-readable storage medium other than a signal per se storing program instructions, wherein the program instructions are computer-executable to implement:
determining a frequency distribution of an input data set, wherein the determining the frequency distribution comprises assigning each data point of the input data set to a category representing a value of a variable for the respective data point;
identifying one or more discontinuities indicated by one or more consecutive categories included in the frequency distribution that contain no data points;
responsive to identifying one or more discontinuities of the frequency distribution, identifying a continuous section of the frequency distribution as a first data set;
fitting a first equation to the first data set.

17. The computer-readable storage medium of claim 16 further comprising program instructions computer-executable to implement:
determining whether the first equation is sufficiently accurate; and
responsive to determining that the first equation is not sufficiently accurate,
generating a new data set comprising only points predicted by the current equation, and
fitting a modified first equation to the new data set.

18. The computer-readable storage medium of claim 16, further comprising program instructions computer-executable to implement:
fitting a second equation to a set of data points within the input data set but not within the first data set; and
determining whether the first equation or the second equation exhibits a greater data set fidelity, wherein
the determining whether the first equation or the second equation exhibits the greater data set fidelity comprises comparing an accuracy measurement for the first equation to an accuracy measurement for the second equation.

19. The computer-readable storage medium of claim 17, further comprising program instructions computer-executable to implement:
determining whether a number of data points from the input data set conforming to the first equation exceeds a number of points from the input data set failing to conform to the first equation.

20. The computer-readable storage medium of claim 16, further comprising program instructions computer-executable to implement:
identifying the input data set from an initial data set, wherein the identifying the input data set further comprises identifying a continuous set of data points in the initial data set.

* * * * *